United States Patent [19]
Rohsler
[11] 3,893,016
[45] July 1, 1975

[54] THYRISTOR CHOPPER CIRCUIT

[75] Inventor: Ivor Carl Rohsler, Birmingham, England
[73] Assignee: Joseph Lucas (Industries) Limited, Birmingham, England

[22] Filed: Mar. 14, 1974
[21] Appl. No.: 451,066

[30] Foreign Application Priority Data
Apr. 6, 1973 United Kingdom .............. 16490/73

[52] U.S. Cl. ................................ 321/45 C; 318/345
[51] Int. Cl. ............................................ H02m 7/52
[58] Field of Search ............ 321/43, 44, 45 R, 45 C; 307/252 M; 318/345, 341

[56] References Cited
UNITED STATES PATENTS

| | | | |
|---|---|---|---|
| 3,354,370 | 11/1967 | Corry et al. | 321/45 R |
| 3,535,559 | 10/1970 | Adams | 307/252 M |
| 3,619,753 | 11/1971 | Thompson | 321/45 C |
| 3,665,286 | 5/1972 | Ohno et al. | 321/45 C |
| 3,784,890 | 1/1974 | Geiersbach | 321/45 C |

*Primary Examiner*—William H. Beha, Jr.
*Attorney, Agent, or Firm*—Andrus, Sceales, Starke & Sawall

[57] ABSTRACT

A thyristor chopper circuit has a load and a main thyristor in series, a second thyristor and a capacitor connected in series across the main thyristor, and an inductor and a third thyristor connected in series across the capacitor. The capacitor charges through the second thyristor, and the charge across it is reversed when the third thyristor conducts. An inductor is provided in series with the capacitor, and the series circuit of third thyristor and inductor is connected across the series circuit of the capacitor and inductor.

1 Claim, 1 Drawing Figure

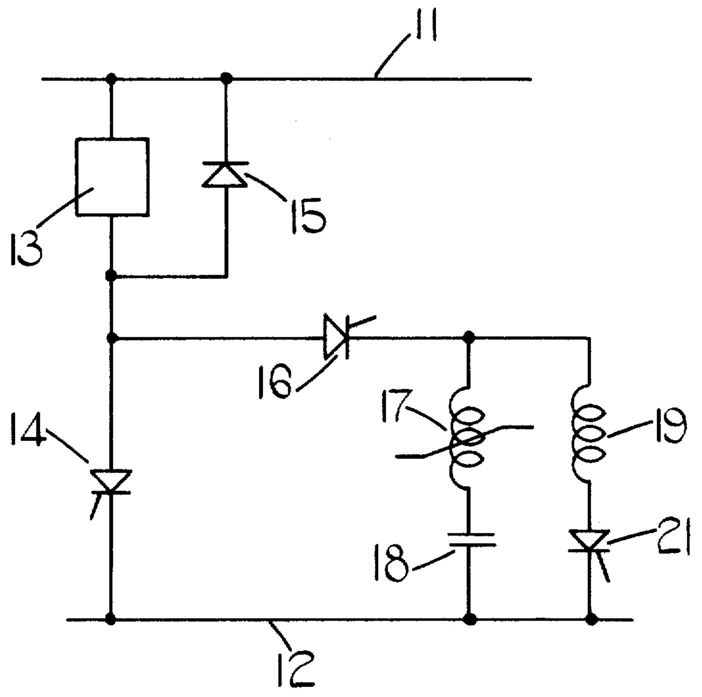
11
13
15
16
17
19
14
18
21
12

THYRISTOR CHOPPER CIRCUIT

This invention relates to thyristor chopper circuits.

The invention resides in a thyristor chopper circuit comprising in combination first and second d.c. supply lines, a load and a main thyristor connected in series across the supply lines, a second thyristor, a first inductor and a capacitor connected in series across the main thyristor, and a second inductor and a third thyristor connected in series across the series combination of the first inductor and capacitor, firing of the second thyristor commutating the main thyristor and charging the capacitor, and firing of the third thyristor reversing the charge on the capacitor, said first inductor having a saturable core but the second inductor having no core.

The accompanying drawing is a circuit diagram illustrating one example of the invention.

Referring to the drawing, there are provided positive and negative supply lines 11, 12. Connected in series between the supply lines in a load 13 and a main thyristor 14. The load may be a motor, and where the load is inductive it is bridged by a freewheel diode 15.

The junction of the load 13 and thyristor 14 is connected to the line 12 through a series circuit including a thyristor 16, an inductor 17 and a capicitor 18. The series combination of inductor 17 and capacitor 18 is bridged by an inductor 19 and a thyristor 21 in series.

In operation, assuming for the moment that the main thyristor 14 has just been turned off, and the thyristor 16 is conducting, then the capacitor 18 charges through the inductor 17. When the capacitor 18 is charged, no further current flows through the thyristor 16, which turns off. Later in the cycle, the thyristor 14 is fired to initiate current flow through the load 13, and the thyristor 21 is also fired, conveniently at the same time at the thyristor 14, so that the charge on the capacitor 18 reverses by way of the inductors 17, 19 and the thyristor 21. When the charge on the capacitor 18 has reversed, no further current flows in the thyristor 21, which therefore turns off. At the end of the cycle, the thyristor 16 is fired again, and the capacitor 18 discharges to turn off the main thyristor 14, and then recharges through the thyristor 16.

Circuits of the general type described above are well known, and the firing circuits for the thyristors are also well know and so are not described in detail. The mean current flow in the load 13 is of course varied by controlling the instances at which the thyristor 14 and 16 are fired.

In accordance with the present invention, the inductor 17 has a saturable core, but the inductor 19 does not have a core. When the capacitor 18 is being charged by current flowing through the thyristor 16 and inductor 17, then the core is driven to one state of saturation. During the reversal of the charge across the capacitor 18, the inductors 17, 19 act in series as a resonant inductor of total value equal to the sum of the inductances of the inductors 17, 19. Typically, the inductors 17 and 19 have values of two microhenries and eighteen microhenries respectively in a system where the voltage between the lines 11, 12 is 240 volts. During reversal of charge on the capacitor 18, the core is driven to its opposite state of saturation. It is known to incorporate an inductor with a saturable core in series with a thyristor so as to limit the rate of rise of current through the thyristor when the thyristor is turned on. In circuits of the general type shown in the drawing, this has been achieved in the past by using two inductors, each having a saturable core. Thus, the inductor 19 has had a saturable core to protect the thyristor 21, and another inductor with a saturable core has been included in series with the thyristor 16, typically between the anode of the thyristor 16 and the junction of the load 13 and thyristor 14. Using the arrangement described, with the inductor 17 in the position shown, then the inductor 17 effectively provides so-called soft turn-on for both the thyristor 16 and the thyristor 21. As compared with the known arrangement, not only does the inductor 19 not need to have a core, but it can be smaller because the inductance of the inductor 17 supplements the inductance of the inductor 19 when the charge on the capacitor 18 is being reserved.

A further advantage of the arrangement shown arises from the fact that the energy stored in inductor 17 during commutation of thyristor 14 by thyristor 16 appears as an increase in voltage on capacitor 18. The amount of boost voltage produced by inductor 17 may be varied by changing the ratio of inductors 17 and 19 to retain the total inductance required for circuit operation.

Thus the system is applicable to situations where the normal circuit inductance is insufficient to produce the required voltage for commutation.

I claim:

1. A thyristor chopper circuit comprising in combination first and second d.c. supply lines, a load and a main thyristor connected in series across the supply lines, a second thyristor, a first inductor and a capacitor connected in series across the main thyristor, and a second inductor and a third thyristor connected in series across the series combination of the first inductor and capacitor, firing of the second thyristor commutating the main thyristor and charging the capacitor, and firing of the third thyristor reversing the charge on the capacitor, said first inductor having a saturable core but the second inductor having no core.

* * * * *